United States Patent
Armingaud et al.

(10) Patent No.: US 7,617,258 B2
(45) Date of Patent: Nov. 10, 2009

(54) SYSTEM FOR REAL-TIME HEALING OF VITAL COMPUTER FILES

(75) Inventors: Francois-Dominique Armingaud, Paris (FR); Fernando Daniel Pedrazzoli Pazos, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 10/556,627

(22) PCT Filed: Apr. 23, 2004

(86) PCT No.: PCT/EP2004/005184

§ 371 (c)(1),
(2), (4) Date: Nov. 10, 2005

(87) PCT Pub. No.: WO2004/012361

PCT Pub. Date: Nov. 25, 2004

(65) Prior Publication Data

US 2006/0253712 A1    Nov. 9, 2006

(30) Foreign Application Priority Data

May 13, 2003   (EP) ................................. 03368045

(51) Int. Cl.
*G06F 17/30* (2006.01)
(52) U.S. Cl. .......................................... 707/204; 707/8
(58) Field of Classification Search ................. 707/202, 707/204

See application file for complete search history.

(56) References Cited

U.S. PATENT DOCUMENTS

| 5,826,012 | A | 10/1998 | Lettvin |
| 6,892,244 | B2* | 5/2005 | De Roose ................... 709/234 |
| 6,961,870 | B2* | 11/2005 | Chiu et al. .................... 714/11 |
| 7,039,830 | B2* | 5/2006 | Qin ............................. 714/13 |
| 2003/0061487 | A1 | 3/2003 | Angelo et al. |

FOREIGN PATENT DOCUMENTS

WO        WO 02 33525       4/2002

OTHER PUBLICATIONS

"Windows File Protection and Windows", Microsoft Support, 'Online!, Dec. 4, 2001, XP002294085, (6 pgs.).
R.A. Grimes: "Malicious Mobile Code—Virus Protection for Windows", Aug. 1, 2001, O'Reilly, USA, XP002294086 (5 pgs.).

* cited by examiner

*Primary Examiner*—Cheryl Lewis
(74) *Attorney, Agent, or Firm*—Schmeiser, Olsen & Watts; David L. Adour

(57) ABSTRACT

A method and healing system for healing a computer's vital files. The healing system includes a system healer having a database that stores a copy of the computer's vital files. The system healer receives identification of condition(s) under which a first vital file is to be changed. The system healer receives notification that the computer has detected a change in the first vital file. If the system healer ascertains that the condition(s) are satisfied, then the system healer replaces the stored copy of the first vital file by the changed first vital file in the system healer's database. If the system healer ascertains that the condition(s) are not satisfied then the system healer sends the stored copy of the first vital to the computer, resulting in replacement of the changed first vital file in the computer by the stored copy of the first vital file.

26 Claims, 3 Drawing Sheets

SYSTEM FOR REAL-TIME HEALING OF VITAL COMPUTER FILES

TECHNICAL FIELD

The present invention relates to the security systems used against hackers trying to gain access to the files stored in a computer and relates in particular to a system for real-time healing of vital computer files.

BACKGROUND

Generally, in a network environment, a System Administrator is the only person authorized to modify some vital programs and system files either on the computer itself or from a centralized monitoring computer. More and more hostile hackers try to compromise these files in order to gain later access to the system. New system leaks are regularly discovered, leading to so-called "exploits" allowing almost anybody—from the inside or from the outside of a Company—to gain the System Administrator privileges for a while. Those means may include—but are not limited to—"race conditions", buffer overflows, stack overflows, etc.

As soon as pirates gain a System Administrator privilege access, they will modify some system files and/or data files in order to enter the system more easily at a later time, because they know the breach they came in by will some day be colmated. They can for instance introduce "backdoors", either by discreet modification of user and/or system directories (and/or permissions), or by a recompilation of some system files, especially on open-source systems. They can even modify a compiler on the compromised system so that any program compiled with it automatically includes such a back door.

A solution to detect such kinds of intrusion is (a) to compute a "MD5 signature" (or a similar signature method as SHA-1 which is better, but slower too) of all the vital files, at computer installation time before the computer is connected to any network, and (b) to store these MD5 signatures in a safe place (e.g. on a diskette which will be set read-only once written; on a CD/R; or by sending them securely on another computer on the network where they will be crypted).

In this method, the periodic monitoring of a data processing to system, checking for files with modified MD5 signatures or files without a MD5 signature in the MD5 signature database, may indicate the presence of an undesirable modification. Remedial action is taken whenever one or many of these conditions occur. The "remedial" generally takes the form of one or many messages to the system administrator or security administrator indicating the list of files without a MD5 signature and/or with a modified MD5 signature.

Although the MD5 signature is a good approach insofar as the MD5 signature of a file is necessarily changed when this file is modified, this solution requires to check all the files on a regular basis, by applying an auto-checking procedure on each computer and collecting the results on a security log that is to be analyzed by the System Administrator or by a software tool. More specifically, (a) if the checking is done too often, the computer resources are intensively solicited. And on the contrary, (b) if the checking is made at larger time intervals, the pirate will have more available time to experiment with the compromised system before he/she is detected. In the majority of environments, these checkings are done every night, for example around 3 a.m., thereby leaving on the average twelve hours to the pirate to cause a lot of trouble on the system. Moreover, he/she gets also a lot of time to restore a sane situation before the checking begins. It should be noted that even the system timestamps associated the last operations on each file can be modified when the pirate has System Administrator's access, thereby covering his/her traces. The local system logs have the same vulnerability.

Therefore, there was a need for a method detecting offensive intrusions in real-time. Such a method, described in the IBM patent application referenced FR 920020083, consists in declaring, at boot time, the vital files of a computer to a program starting at boot time, and which launches a daemon detecting any modification related to the declared vital files. Upon the detection of such a system call, this method raises an interrupt and sends a message to the administrator computer. Some seconds later, it identifies which vital computer file originated the system call and sends it in a second message. Although such a method enables the administrator to know, in real-time, when there is a hacker intrusion, it does not provides a solution to heal the vital computer files which have been attacked.

SUMMARY OF THE INVENTION

Accordingly, the main object of the invention is to provide a system enabling healing in real-time of the vital computer files whether programs or data, when they have been intruded by hackers The invention relates therefore to a real-time healing system in a data transmission system comprising a transmission network to which are connected the healing system and at least a data processing device having vital files to be protected against a pirate intrusion. Such a healing system comprises a system healer including means for storing the vital files, means for identifying the conditions enabling the modifications of the vital files, means for detecting when one of the vital files has been modified, and means for copying back into the data processing device the clean vital file when the modification of the vital file in the data processing device does not meet the required conditions.

According to another aspect, the invention relates to a method for real-time healing a computer having at least a vital file in a data transmission system including a network to which is connected a healing layer, consisting in storing the vital file in a system healer included in the healing layer, identifying in the system healer the conditions enabling the modifications of the vital file, detecting when the vital file has been modified, and copying back the vital file into the corresponding data processing device when the modifications do not meet the required conditions.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
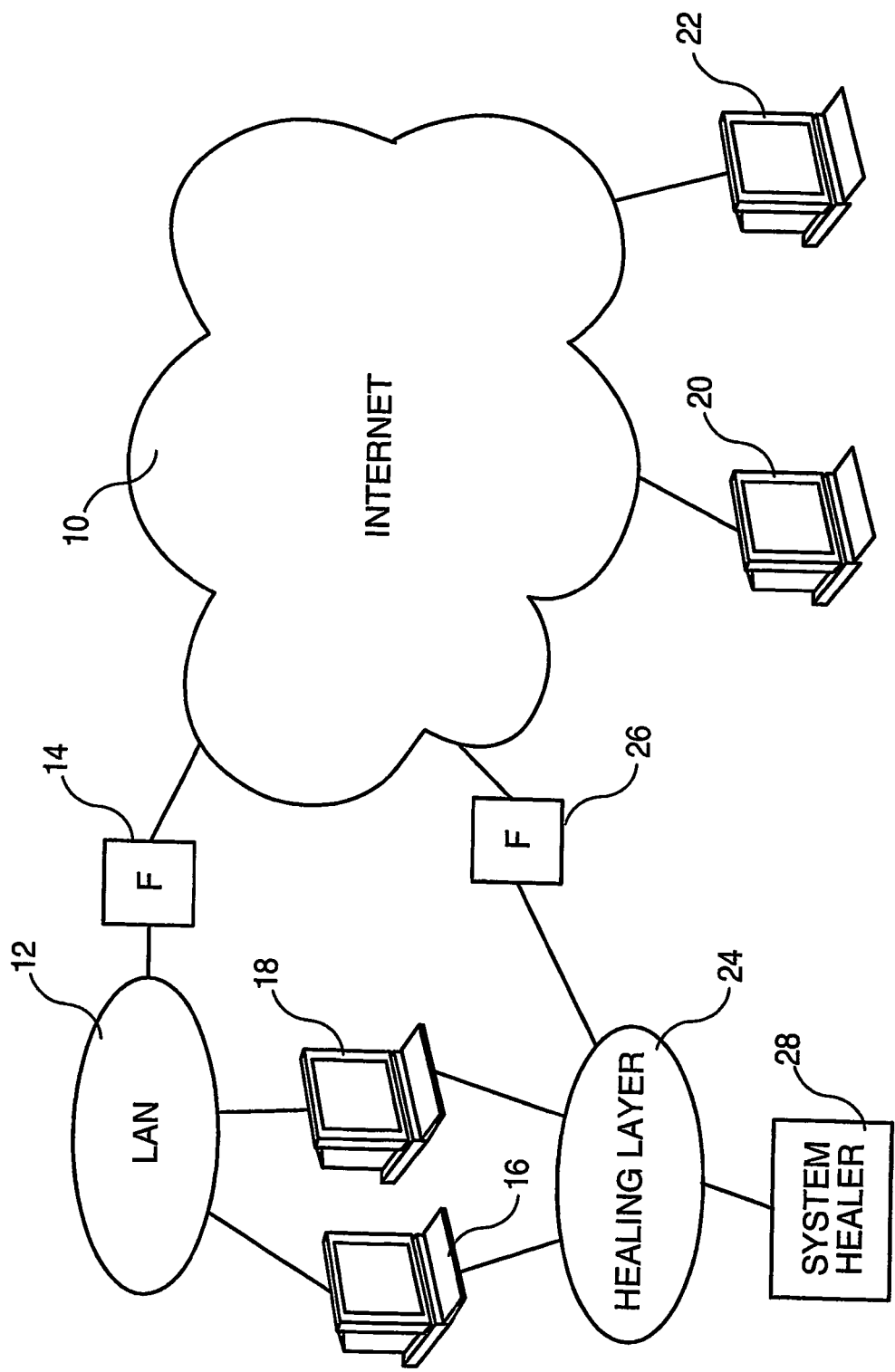
FIG. 1 is a block diagram of a data transmission system wherein is implemented the healing system according to the invention.

The invention described hereafter is preferably implemented with computers running operating systems such as Windows or Linux, but may be used with any operating system having equivalent characteristics necessary to operate the invention. The healing system according to the invention comprises a transmission network 10 such as Internet, a general Local Area Network (LAN) 12 connected to the transmission network by a firewall 14, and several computers to be monitored such as computers 16 and 18 connected to LAN 12 or computers 20 and 22 belonging to a Virtual Private Network (VPN) and being connected directly to transmission network 10.

A specialized network 24 either real such as a dedicated LAN or virtual (a set of services associated with a VPN) called the healing layer is connected to the transmission network 10 by a firewall 26. The healing layer should preferably be isolated physically, logically, or both from the rest of the network, for instance through the use of dedicated adapters and/or subnetting.

Also, a system healer 28 which constitutes the main feature of the invention, is connected to the healing layer 24. Such a system healer is a dedicated "computer" in charge of remotely repairing the vital files of the computers being monitored, such as computers 16, 18 which are connected directly to the healing layer or computers 20, 22 connected to the network 10. It must be noted that the system healer 28 is also used as a repository for clean copies of all vital files of the monitored computers, together with their MD5 signatures to speed the process.

As mentioned, the system healer is preferably hosted in a dedicated computer. It can also be implemented as either an isolated program through a virtualization mechanism, or even as a daemon (resident program) providing some precautions to be specified later. In these two cases, the System Healer is therefore able to heal not only other systems, but to heal itself as well—something very unlikely to be needed, anyway, as the System Healer appears a "bare" black box with only its system healing ports open, unless it is implemented as a daemon on an existing computer, without virtualization (a possible, but not preferred, implementation).

For the system healer, a preferred isolation is a virtualization system like z/VM on the z-Series (390) computer line, VMWARE™ on hardware that supports it (presently the Intel and AMD 32-bit lines of computers, and possibly more). Another type of isolation, though complicated and subject to race conditions, could be to have a multiple set of files containing the healing data and system (with random, concealed names) and monitor them as vital files themselves. A MD5 table protected in the kernel or in a kernel module would allow to determine the unaltered copy(ies).

It is assumed here that a monitored computer can be any data processing device such as a general purpose computer, an attended or unattended user workstation, a file server, a name server, a database server, a gateway, a web server or any other type of service or set of services running under control of an operating system, able to detect when one of its vital files is modified.

Figure 2:
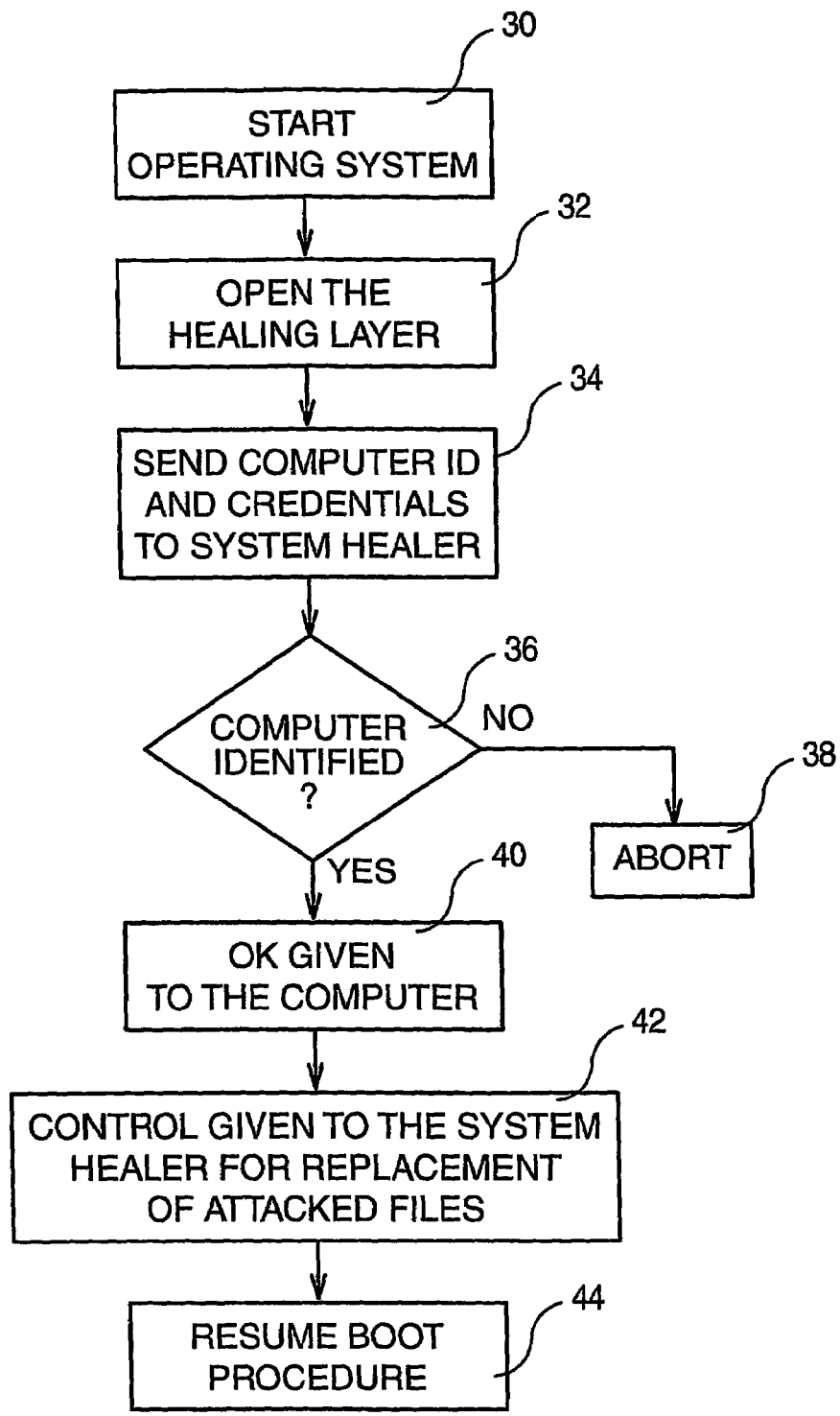
FIG. 2 is a flow chart representing the boot procedure on a monitored computer.

In a monitored computer, boot files must be organized so that the healing layer is always opened before any other part of the system and no other part of the system starts before being allowed by the healing layer. This implies that the boot of any monitored computer will be done according to the method illustrated by the flow chart of FIG. 2.

At the beginning, the operating system of the computer is started (step 30). Then, the healing layer is opened (step 32) and the computer sends its identification and credentials to the system healer (step 34) which determines whether the computer is identified (step 36). If not, the procedure is aborted (step 38). If the computer is identified, the OK is given by the system healer to the computer for continuing the boot procedure (step 40). At this stage, the computer gives control to the system healer for replacement in its database of all vital files of the computer which could have been attacked (step 42). Finally, the boot is resumed (step 44).

It must be noted that on the very first time a computer is connected to the healing layer, and before it is connected to any other type of network, a copy of all its vital files is sent to the system healer for storing them as "clean" files in its database.

In summary, the healing layer is used to carry specifically:
  handshaking mechanisms between monitored computers and the system healer for identification,
  vital files notification changes from a presumably attacked computer to the system healer,
  mandatory commands from the system healer to the presumably attacked computer and if necessary, to shutdown its communication activities. Note that these commands are handled on the attacked computer by a local daemon having a strong priority upon all others processes,
  the transfer of altered files to the system healer for post-attack analysis,
  the transfer of a good copy of the vital files to the attacked computer, and
  in extreme cases, the shutdown and the restart of the attacked computer itself after a thorough computer cleaning. This will be needed either when the attacked computer does not have its expected behavior, or when some files cannot be replaced because the operating system sees them as "currently in use" by a non stoppable process.

Note also that the vital files, even with the same name and path, are proper to a given computer (for instance/etc/passwd on UNIX systems), but most of them (system programs) are not. Therefore, the system healer will store only one copy for files having both the same name (path excluded) and same MD5 signature. The odds of two files ever having the same signature are estimated to be comprised between 1 over $2^{47}$ and 1 over $2^{128}$ (1 over $2^{160}$ for SHA-1), and the fact that we compare only MD5 keys of files having the same name make the risk of collision lower still. Also, in that way, files having the same name on different computers, but different MD5 signatures—which is the case for different releases of a given system or program—will not get mixed up.

A counter system for the number of referenced copies is used. It is incremented whenever a new reference is added, decremented when this number is decreased. The copy itself can be suppressed when the counter reaches zero, a well-known technique of "garbage collection".

Whenever a file is modified, the System Healer determines whether this modification has been planned (system or application upgrade, system patch, installation or de-installation of new software) and therefore declared in a table stored in a file or database—according to both the granularity needed for security and ease of maintenance needs. In all other cases, all the modified files are restored to their original state, a copy of which being kept in the healer system.

The structure of each entry in the table (in a file or database) is the following one: (1) specification, credentials and fingerprint of a computer that registered itself to the System Healer as a candidate for healing (this may use computer name or network address—IP, IPX, MAC or whichever designation will be considered as the most secure for the considered set of computers and the security network connecting them); (2) full path of each vital file for which a modification is authorized (the list of these files is normally readily available in the installation/de-installation package for Windows as well as Linux packages (RPMS, DEBs, and other formats) as well as plain UNIX tarball ("tar tvf tarball-name"); (3) planned time window where this modification is authorized, that is, will only raise an information message and a regular trace log instead of generating an alert and initiate the automatic repair process. It is worthy to note that the knowledge of time does not require a precision up to the second or even the minute, so the use of a time server (which could itself contain security flaws) is not mandatory here.

For example, a logical structure for the table could be the following:
  a. Identification of the computer for which a modification is planned (e.g. IP address),
  b. Name of file to be modified including its path and file name (generally found in the de-installation table provided with software),
  c. Expected type of change (will be created, modified, deleted or "do not care"),
  d. Expecting monitoring (may be changed, does not have to, has to be changed once or more, has to be changed only once),
  e. Earliest allowed modification,
  f. Latest allowed modification,
  g. Counter for the number of modifications of the file in the given delay.

It must be noted that items e. and f. are filled in bulk mode by the system administrator according to the time when he wants to install or update the system. In some trivial but often occurring cases—for instance adding, deleting or changing information about a user or file access parameters in the system—, such entries can be automatically added by a trivial script doing both the table insertion in the system healer and the wanted modification on the target system, the latter being done by the system healer commands to the remote system, for instance one minute later.

Figure 3:
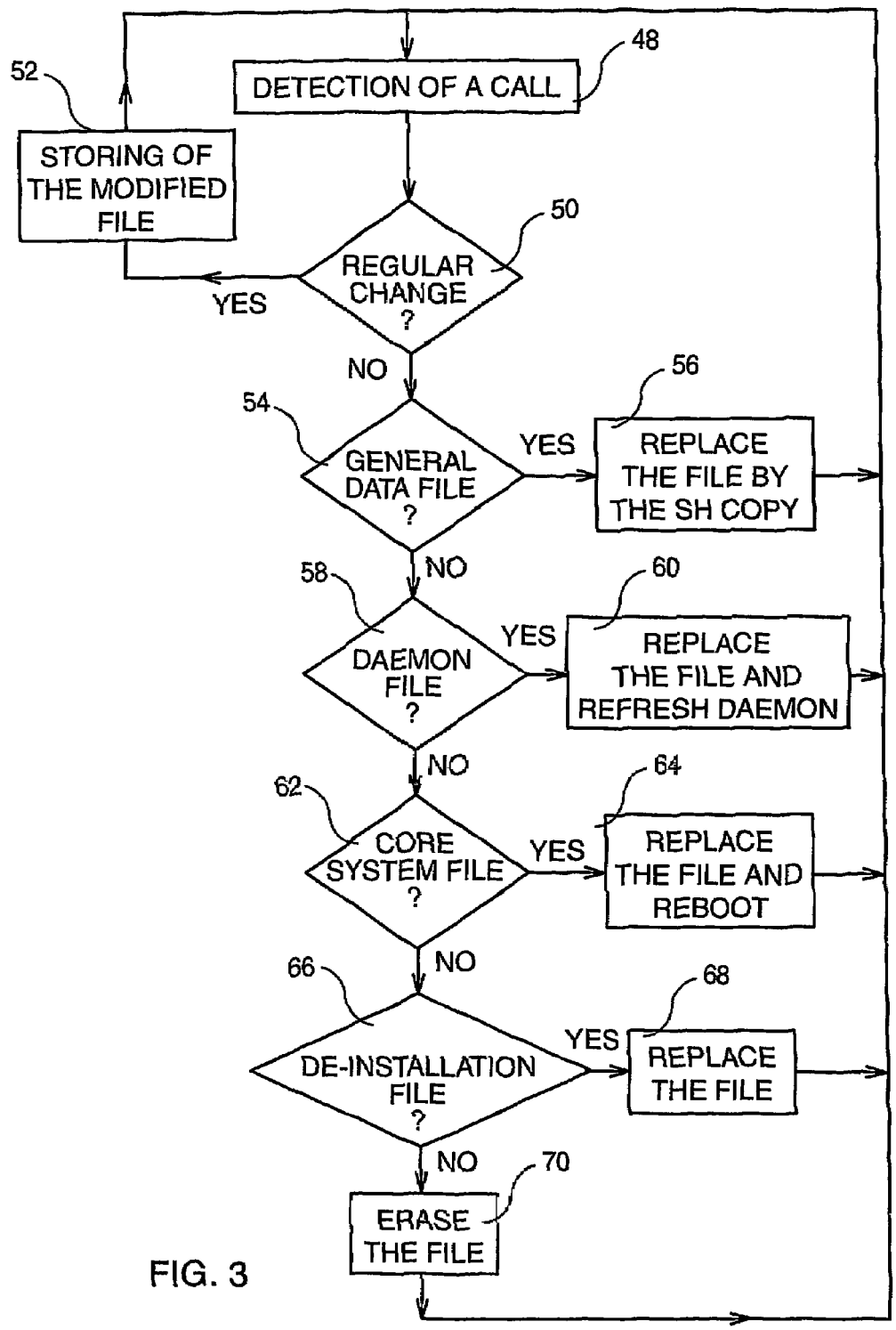
FIG. 3 is a flow chart representing the steps of the method used by the system healer when a file modification is detected.

The healing process is now described in reference to FIG. 3. When a "delete" or "open for modification" call is detected on one of the vital files of a presumably attacked computer (step 48), the principle of the invention is to check whether it is a regular change or not (step 50) in order to issue an alert or not. This checking is preferably made in real-time by the computer raising an automatic interrupt caught by an asynchronous routine (known as a daemon) which sends a message to the system healer. However, the checking could also be done in deferred time (batch mode) by scanning periodically the vital files using a specific software such as Enterprise System Manager (ESM) of Symantec.

When the call of the presumably attacked computer or a call from a batch monitoring security system is received by the system healer, the parts of the table related to the presumably attacked computer are brought into main memory. In an possible alternate implementation, all the table lines containing the present time could be kept in memory by a cron or cron-like job activated every minute or so.

As soon as the name of a modified vital file arrives, the system healer checks whether the corresponding change is planned or not, according to the aforementioned table. Thorough mutual identification of the (presumably until verified otherwise) wounded computer and the system healer is ensured by state-of-the art techniques, including—but not limited to—MAC address identifications, IP address control, challenge/answer passwords, use of eventual public key identification. Though it is preferred that the healing layer owns and uses its own dedicated physical network because of the low total cost of ownership (TCO) and high isolation—therefore security—of this scheme, the use of subnetting in an existing LAN, a VPN, or even coexistence on the same physical computer though proper isolation as described above can be considered. For security reasons, the system healer should not honor any remote login attempt, and preferably not offer any other external service than this healing service, for which a port should be reserved and all the others closed. The System Healer should ideally be a black box, with its operating system mounted on a CD, CD/R, DVD or DVD-RW/DVD+RW, "á la Knoppix" (Knoppix is a Linux system that just runs from a CD without using the hard disk) just having enough writable non-volatile memory (small hard disk, flash card or USB key storage) to store its data files. As the System Healer must guarantee a non-stop operation, a preferred solution is to have two working System Healers—a master one and a backup one which takes over whenever the master unit fails. Both units store information in parallel, only the master replies under normal circumstances, the backup taking over whenever the master did not reply within a time-out delay.

An alert is raised on the System Healer if the current time falls out of the planned time periods for a real-time system, or if that period is not included in the time between this run and the preceding one in the case of a batch security system. Otherwise, the change is operated. Note that the timestamps associated with each file are not used, because if a pirate gained supervisor access, they are not reliable.

The skilled person will understand that the alert may be raised in any form, such as a particular message on the computer display and/or the start of a procedure.

If the requested modification of the file corresponds to a regular change, the process is looped back to the detection of a next call after that the modified file has been copied in the database of the system healer to replace the preceding version of the file (step 52).

At this stage it is useful to mention that three kinds of vital files are to be considered: general data files, daemon files and core system files. Accordingly, the process determines whether the file is a general data file (step 54). If so, the file is replaced by the copy stored in the system healer as soon as all processes that could be using this file are killed (step 56) and the process is looped back to the beginning.

If it is not a general data file, it is determined whether the file corresponds to a daemon file which has a data part (configuration file) and an executable part (daemon itself) (step 58). In the first case, not only the configuration file will have to be restored, but the daemon executable must be checked too and refreshed, which means it re-reads its configuration file to act accordingly (step 60). In the second, the daemon will have to be stopped or eventually killed, a fresh copy brought back from the System Healer, and the daemon restarted.

If it is not a daemon file, it is determined whether the file corresponds to a core system file which cannot be safely changed without a reboot (step 62). If so, the file is replaced by the copy stored in the system healer, but this copy has (step 64) to be downloaded from the system healer to a dedicated directory from where it will be refreshed at reboot time (this is a general scheme available on operating systems so they can load their own updates. In Windows, for instance, the list of files to be rebooted is stored in the Registry entry "System\CurrentControlSet\Control\SessionManager[PendingFileRenameoperations]").

If it is not a core system file, the last case consisting in determining whether the file is one of the de-installation files as already mentioned above (step 66). A hash table can be used to determine that quickly. If the file name is present in the de-installation file, it is replaced by the copy stored in the system healer (step 68). If it is not the case, the file is erased (step 70) after being copied to the SH for post-analysis purposes by the System Administrator or Security Administrator. The process is looped back to the beginning in both cases.

In any case, when an intrusion has been detected, it is necessary to kill all processes using the attacked file (including the pirate's session) which can be identified by a search in a system table. Another way to do that is reverting temporarily the wounded computer to a single-user mode in which only the healing layer is recognized, after a graceful exit from multi-user mode. The System Healer is in a read only access mode to avoid any modification to the copied files or to avoid any file creation while the original files are being copied. Whenever the healing process is launched, all communications to connect to the intruded computer are rejected except the one to the system healer. All communications are (gracefully) closed and will not be restored until the self-healing procedure is ended, in order to preserve from another unwanted intervention and/or intrusion. In most cases, the process will not need a reboot.

Once the files are copied, the system administrator makes all the changes to maintain and/or to update the system healer machine with the appropriate files—which mean the original files before intrusion—while all communication connections to the intruded computer other than the one declared in either a kernel table (Linux and other open-source systems) or a monitored file (Windows and other proprietary systems) are closed and the healing feature is off. When the maintenance/update of the intruded computer is ended, the changes introduced by the authorized system administrator are copied to the system healer, which is then switched from read access only mode to a writeable one, and back to read only mode when this procedure is finished.

Note that, although the present invention has been described in the context of a network system, those skilled in the art will appreciate that the mechanisms of the present invention are capable of being distributed as a program product in a variety of forms to any type of information handling system, and that it applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

The invention claimed is:

1. A method for healing vital files of at least one computer by a healing system, said healing system comprising a system healer and a healing layer, said system healer adapted to be connected to said at least one computer by the healing layer, said method comprising:
    storing a copy of all vital files of a first computer of the at least one computer in a database of the system healer;
    receiving identification of at least one condition under which a first vital file of said all vital files of the first computer is planned to be changed on the first computer;
    after said receiving identification, receiving notification from the first computer that the first computer has detected a change in the first vital file on the first computer; and
    after said receiving notification, ascertaining whether or not the at least one condition has been satisfied;
    if said ascertaining has ascertained that the at least one condition has been satisfied, then replacing the stored copy of the first vital file by the changed first vital file in the database of the system healer; and
    if said ascertaining has ascertained that the at least one condition has not been satisfied, then sending the stored copy of the first vital to the first computer, resulting in replacement of the changed first vital file in the first computer by the stored copy of the first vital file,
    wherein said storing, said receiving identification, said receiving notification, said ascertaining, said replacing, and said sending are performed by the system healer.

2. The method of claim 1, wherein said ascertaining has ascertained that the at least one condition has been satisfied.

3. The method of claim 1, wherein said ascertaining has ascertained that the at least one condition has not been satisfied.

4. The method of claim 3, wherein after said ascertaining the method further comprises rejecting attempts to communicate with the first computer until said replacement of the changed first vital file in the first computer by the stored copy of the first vital file has been completed.

5. The method of claim 1, wherein said storing is performed at a first time that the first computer is connected to the system healer via the healing layer.

6. The method of claim 5, wherein said storing is performed before the first computer is connected to any other computer or network.

7. The method of claim 1, wherein said storing comprises storing each said vital file along with its MD5 signature.

8. The method of claim 7, wherein said storing comprises storing only one copy of vital files having the same filename exclusive of its path and having the same MD5 signature.

9. The method of claim 1, wherein the system healer is hosted in a dedicated computer that is dedicated to healing the vital files of the at least one computer.

10. The method of claim 1, wherein the at least one condition comprises a condition of the first vital file being changed during a specified time window.

11. The method of claim 10, wherein said ascertaining comprises accessing the at least one condition from a table that comprises the at least one condition, and wherein the table includes a logical structure that comprises an identification of the first computer, a filename of the first vital file including its path, an expected type of change in the first vital file, an expected monitoring of the first vital file, and the specified time window.

12. The method of claim 10, wherein said ascertaining has ascertained that the at least one condition has not been satisfied, and wherein the method further comprises issuing an alert by the system healer if a current time during said ascertaining is outside of the specified time window.

13. The method of claim 1, wherein the healing system further comprises a backup system healer, wherein the method further comprises storing said all vital files of the first computer in parallel by the system healer and the backup system healer, and wherein the backup system healer acts in place of the system healer when the system healer fails.

14. The method of claim 1, wherein the system healer is in a read-only access mode when the system healer is sending the stored copy of the first vital to the first computer in response to said ascertaining having ascertained that the at least one condition has not been satisfied.

15. A healing system comprising a system healer and a healing layer, said system healer adapted to be connected to said at least one computer by the healing layer, said system healer adapted to perform a method for healing vital files of at the least one computer, said method comprising:

storing a copy of all vital files of a first computer of the at least one computer in a database of the system healer;

receiving identification of at least one condition under which a first vital file of said all vital files of the first computer is planned to be changed on the first computer;

after said receiving identification, receiving notification from the first computer that the first computer has detected a change in the first vital file on the first computer; and after said receiving notification, ascertaining whether or not the at least one condition has been satisfied;

if said ascertaining has ascertained that the at least one condition has been satisfied, then replacing the stored copy of the first vital file by the changed first vital file in the database of the system healer; and if said ascertaining has ascertained that the at least one condition has not been satisfied, then sending the stored copy of the first vital to the first computer, resulting in replacement of the changed first vital file in the first computer by the stored copy of the first vital file.

16. The healing system of claim 15, wherein if said ascertaining has ascertained that the at least one condition has not been satisfied, then after said ascertaining the method further comprises rejecting attempts to communicate with the first computer until said replacement of the changed first vital file in the first computer by the stored copy of the first vital file has been completed.

17. The healing system of claim 15, wherein said storing is performed at a first time that the first computer is connected to the system healer via the healing layer.

18. The healing system of claim 17, wherein said storing is performed before the first computer is connected to any other computer or network.

19. The healing system of claim 15, wherein said storing comprises storing each said vital file along with its MD5 signature.

20. The healing system of claim 19, wherein said storing comprises storing only one copy of vital files having the same filename exclusive of its path and having the same MD5 signature.

21. The healing system of claim 15, wherein the system healer is hosted in a dedicated computer that is dedicated to healing the vital files of the at least one computer.

22. The healing system of claim 15, wherein the at least one condition comprises a condition of the first vital file being changed during a specified time window.

23. The healing system of claim 22, wherein said ascertaining comprises accessing the at least one condition from a table that comprises the at least one condition, and wherein the table includes a logical structure that comprises an identification of the first computer, a filename of the first vital file including its path, an expected type of change in the first vital file, an expected monitoring of the first vital file, and the specified time window.

24. The healing system of claim 22, wherein if said ascertaining has ascertained that the at least one condition has not been satisfied, then after said ascertaining the method further comprises issuing an alert by the system healer if a current time during said ascertaining is outside of the specified time window.

25. The healing system of claim 15, wherein the healing system further comprises a backup system healer, wherein the method further comprises storing said all vital files of the first computer in parallel by the system healer and the backup system healer, and wherein the backup system healer acts in place of the system healer when the system healer fails.

26. The healing system of claim 15, wherein the system healer is in a read-only access mode when the system healer is sending the stored copy of the first vital to the first computer in response to said ascertaining having ascertained that the at least one condition has not been satisfied.

\* \* \* \* \*

UNITED STATES PATENT AND TRADEMARK OFFICE
CERTIFICATE OF CORRECTION

PATENT NO.       : 7,617,258 B2                              Page 1 of 1
APPLICATION NO. : 10/556627
DATED             : November 10, 2009
INVENTOR(S)       : Armingaud et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1032 days.

Signed and Sealed this

Nineteenth Day of October, 2010

David J. Kappos
*Director of the United States Patent and Trademark Office*